(12) United States Patent
Brewster (10) Patent No.: US 11,927,042 B2
(45) Date of Patent: Mar. 12, 2024

(54) QUICK-RELEASE HINGE DEVICES, SYSTEMS AND METHODS

(71) Applicant: Airbus Americas, Inc., Mobile, AL (US)

(72) Inventor: John A. Brewster, Mobile, AL (US)

(73) Assignee: Airbus Americas, Inc., Mobile, AL (US)

( * ) Notice: Subject to any disclaimer, the term of this patent is extended or adjusted under 35 U.S.C. 154(b) by 315 days.

(21) Appl. No.: 17/390,417

(22) Filed: Jul. 30, 2021

(65) Prior Publication Data
US 2023/0036589 A1    Feb. 2, 2023

(51) Int. Cl.
E05D 7/10    (2006.01)
B64C 1/14    (2006.01)
E05D 3/02    (2006.01)

(52) U.S. Cl.
CPC .......... *E05D 7/1044* (2013.01); *B64C 1/1469* (2013.01); *E05D 3/02* (2013.01); *E05Y 2900/502* (2013.01); *E05Y 2900/531* (2013.01)

(58) Field of Classification Search
CPC ....... E05D 7/10; E05D 7/1005; E05D 7/1044; E05D 2007/126; E05D 2007/1027; E05D 5/12; E05D 5/128; E05D 3/02; B64C 1/1469; E05Y 2900/502; E05Y 2900/531; E05Y 16/381; E05Y 16/38; E05Y 16/262; E05Y 16/263
See application file for complete search history.

(56) References Cited

U.S. PATENT DOCUMENTS

| 485,613 | A | | 11/1892 | Deane |
| 713,338 | A | * | 11/1902 | Paquette ................. E05D 5/128 |
| | | | | 16/381 |
| 1,052,701 | A | * | 2/1913 | Watter ...................... E05D 3/02 |
| | | | | 16/263 |
| 1,754,013 | A | | 4/1930 | Fisher |

(Continued)

FOREIGN PATENT DOCUMENTS

| CN | 104033059 A | * | 9/2014 |
| CN | 212507860 U | * | 2/2021 |

(Continued)

OTHER PUBLICATIONS

International Search Report and Written Opinion for Application No. PCT/US2022/038843 dated Oct. 28, 2022.

*Primary Examiner* — Chuck Y Mah
(74) *Attorney, Agent, or Firm* — KDW Firm PLLC (57) ABSTRACT

A rapidly disassembled hinge suitable for use in an aircraft includes a first attachment plate attached to a supported structure, a second attachment plate attached to a supporting structure, and a pin with a notch in an outer surface thereof, which is insertable into portions of the first and second attachment plates for pivotably connecting the first and second attachment plates together. The pin is inserted so that the notch is positioned within the second attachment structure when the hinge is in an assembled state. A key includes a main body and a distal end extending from the main body, the distal end being insertable within the notch of the pin. The key is movable such that the distal end of the key can be inserted into and removed from engagement with the notch of the pin to provide for toolless disassembly of the hinge.

18 Claims, 5 Drawing Sheets

(56) References Cited

U.S. PATENT DOCUMENTS

| | | | |
|---|---|---|---|
| 1,758,309 A | 5/1930 | Block | |
| 2,201,594 A | 5/1940 | Sitts | |
| 2,369,148 A * | 2/1945 | Langhorst | E05D 7/1005 16/229 |
| 3,135,013 A * | 6/1964 | Parsons | E05D 5/12 16/259 |
| 3,602,942 A | 9/1971 | Neff, Sr. et al. | |
| 3,733,649 A * | 5/1973 | Nagy | E05D 11/0018 16/380 |
| 3,969,788 A | 7/1976 | McCulloch | |
| 4,135,273 A | 1/1979 | Stannard | |
| 4,455,711 A | 6/1984 | Hartwell | |
| 4,475,266 A * | 10/1984 | Suska | E05D 5/14 16/386 |
| 5,040,268 A * | 8/1991 | Knurr | E05D 5/10 16/386 |
| 5,642,910 A | 7/1997 | Betherum | |
| 5,666,695 A | 9/1997 | Jegers et al. | |
| 5,711,053 A | 1/1998 | Hafner | |
| 5,722,121 A * | 3/1998 | Lau | E05D 5/128 16/389 |
| 6,317,928 B1 | 11/2001 | Guillemette | |
| 6,591,453 B2 | 7/2003 | Jenks | |
| 7,296,832 B1 | 11/2007 | Campbell | |
| 7,891,056 B2 | 2/2011 | McAfee | |
| 8,464,396 B2 * | 6/2013 | Westby | E05D 11/0018 16/386 |
| 9,609,945 B2 | 4/2017 | Krusin et al. | |
| 9,765,556 B2 | 9/2017 | Stots | |
| 10,415,282 B2 * | 9/2019 | Klaffke | E05D 7/1022 |
| 2003/0052227 A1 | 3/2003 | Pittman | |
| 2022/0259908 A1 * | 8/2022 | Gorontzi | E05D 7/1044 |
| 2022/0282537 A1 * | 9/2022 | Khalife | E05D 11/00 |
| 2022/0290477 A1 * | 9/2022 | Bender | E05D 5/128 |

FOREIGN PATENT DOCUMENTS

| | | | | |
|---|---|---|---|---|
| DE | 3314753 A1 * | 10/1984 | | |
| DE | 197 07 629 A1 | 10/1997 | | |
| JP | 2009275477 A * | 11/2009 | | |
| WO | WO-2019009703 A1 * | 1/2019 | | E05D 3/02 |

* cited by examiner

QUICK-RELEASE HINGE DEVICES, SYSTEMS AND METHODS

TECHNICAL FIELD

The disclosure herein relates to devices, systems, and methods for pivotably attaching a structure or structures together. Specifically, the disclosure herein relates to hinge devices, systems and methods that are capable of being disassembled to allow egress through the barrier secured in place by the hinge.

BACKGROUND

The ability of the flight crew of an aircraft to ensure that access to the cockpit of an aircraft during flight is of paramount importance in seeking to safeguard the wellbeing of all occupants onboard the aircraft. While in recent years the use of so-called "hardened" doors (e.g., doors that are reinforced to resist attempts to force the door open, or to break the door down) to the cockpit has increased, the fact remains that it is oftentimes necessary for a member of the flight crew to enter or exit the cockpit during flight, thereby presenting a momentary opportunity for a passenger to seek to access the cockpit while the cockpit door is temporarily open or unsecured. In order to prevent such occurrences, it is anticipated that Federal Aviation Guidelines will require that aircraft be provided with so-called "secondary barriers" that prevent unauthorized access to the area of the aircraft cabin adjacent to the cockpit. Such secondary barriers are generally not "hardened," or structurally reinforced, so as to prevent any and all access to the area blocked by the secondary barrier, but is instead provided to slow down (e.g., for a prescribed period of time) any person(s) who may otherwise seek to gain access to such restricted-access areas while the hardened cockpit door is not secured. By slowing the ability of unauthorized persons towards, for example, an unsecured cockpit door, any flight crew members within the restricted-access area will immediately notice the attempted unauthorized access by any such persons and, as such, will be able to take action to secure, for example, the cockpit door against intrusion before such unauthorized persons are able to break through the secondary barrier and gain access to the restricted-access area.

At the same time, it is still necessary for flight crew members to be able, such as during an emergency, to evacuate the aircraft. During an emergency, electrical structures may fail to operate and/or the structural integrity of even mechanical latches may be compromised to the point that such latches may no longer be operable to unlatch and allow for a barrier to be moved. In such a situation, flight crew members might be trapped on the opposite side of such an inoperable barrier and may be unable to safely evacuate the aircraft in an emergency. As such, a need exists at present for a hinge that is capable of being disassembled during an emergency, whether because the barrier is secured in place with a time-delay latch or because the latch is otherwise inoperable, to allow for safe egress of passengers and/or flight crew of an aircraft the ability to rapidly disassemble and remove the barrier during an emergency.

SUMMARY

According to an example embodiment, a mechanical and non-electrical hinge configured for toolless assembly and disassembly is provided, the hinge comprising: a first attachment plate configured for attachment to a supported structure; a second attachment plate configured for attachment to a supporting structure; a pin comprising a notch formed in an outer surface of the pin and configured for insertion into the first and second attachment plates for pivotably connecting the first and second attachment plates together, wherein the pin is inserted so that the notch is positioned within the second attachment structure when the hinge is in an assembled state; and a key that comprises a main body and a distal end extending from the main body, which is configured for insertion within the notch of the pin; wherein the key is movable such that the distal end of the key can be inserted into and removed from engagement with the notch of the pin to provide for toolless disassembly of the hinge.

In some embodiments of the hinge, the second attachment plate comprises a bore hole formed within a pivot region of the second attachment plate; the second attachment plate comprises a recess that is connected, via a slot formed in the second attachment plate, with the bore hole of the second attachment plate; the pin, when the hinge is in an assembled state, is positioned within the bore hole of the second attachment plate, such that the notch of the pin is coplanar with the slot; and the recess is configured such that, during assembly of the hinge, the key is insertable within the recess and configured to slide through the slot, such that the distal end of the key is inserted into the bore hole of the second attachment plate and into at least a portion of the notch of the pin.

In some embodiments of the hinge, the pin is fixedly attached within a bore hole formed in a pivot portion of the first attachment plate, such that the pin cannot be removed from the bore hole of the first attachment plate while the distal end of the key is positioned within the notch of the pin.

In some embodiments of the hinge, the notch is formed by a collar of the pin which has a reduced diameter than a diameter of an upper portion and a lower portion of the pin that are attached on respective opposite ends of the collar to form the pin.

According to another example embodiment, a system for controlling access to a restricted access area is provided, the system comprising: a supporting structure that defines at least a portion of the restricted access area; a supported structure; and a plurality of hinges, each of which is configured for toolless assembly and disassembly and comprises: a first attachment plate, which is attached to the supported structure; a second attachment plate, which is attached to the supporting structure; a pin comprising a notch formed in an outer surface of the pin and configured for insertion into the first and second attachment plates for pivotably connecting the first and second attachment plates together, wherein the pin is inserted so that the notch is positioned within the second attachment structure when the hinge is in the assembled state; and a key that comprises a main body and a distal end extending from the main body, which is configured for insertion within the notch of the pin to prevent the first and second attachment plates from being separated in an axial direction of the pin while the distal end of the key is inserted within the notch of the pin; wherein each of the plurality of hinges is configured such that the supported structure is movable, relative to the supporting structure, between a closed position, in which access to the restricted access area is blocked by the supported structure, and an open position, in which access to the restricted access area is not blocked by the supported structure.

In some embodiments of the system, the second attachment plate comprises a bore hole formed within a pivot region of the second attachment plate; the second attachment plate comprises a recess that is connected, via a slot formed in the second attachment plate, with the bore hole of the second attachment plate; the pin, when the hinge is in an assembled state, is positioned within the bore hole of the second attachment plate, such that the notch of the pin is coplanar with the slot; and the recess is configured such that, during assembly of the hinge, the key is insertable within the recess and configured to slide through the slot, such that the distal end of the key is inserted into the bore hole of the second attachment plate and into at least a portion of the notch of the pin.

In some embodiments of the system, each of the plurality of hinges is configured such that, during disassembly, the key is configured to slide within the recess, such that the distal end of the key moves within the slot in a direction away from the bore hole of the second attachment plate to disengage the distal end of the key from the notch of the pin, such that the hinge is in a disassembled state; and when each of the hinges is in the disassembled state: the supported structure is configured to be lifted, relative to the supporting structure, in the axial direction of the pin, such that the first attachment plate and the second attachment plate are disconnected from each other; and the supported structure is movable into a position other than the closed position so that egress from the restricted access area is not blocked by the supported structure.

In some embodiments of the system, each of the plurality of hinges is configured for disassembly by an occupant within the restricted access area using only one or both hands of the occupant.

According to another example embodiment, an aircraft comprising a restricted access area and any of the systems disclosed herein is provided, wherein the restricted access area is a region of the aircraft in which only a flight crew member of the aircraft is authorized entry at least during some portions of flight of the aircraft.

In some embodiments of the aircraft, the supporting structure is a cabin monument of the aircraft, the supported structure is a door, and a cockpit door is accessible directly from within the restricted access area.

According to another example embodiment, a method of controlling access to a restricted access area of an aircraft is provided, the method comprising: providing at least one hinge, each hinge comprising a first attachment plate, a second attachment plate, a pin comprising a notch formed in an outer surface of the pin, and a key; attaching the second attachment plate to a supporting structure; attaching the first attachment plate to a supported structure that is movable between a closed position, in which access to the restricted access area of the aircraft is blocked by the supported structure, and an open position, in which access to the restricted access area of the aircraft is not blocked by the supported structure; pivotably connecting, using the pin, the first attachment plate and the second attachment plate; inserting the key such that a distal end of the key is inserted within the notch of the pin to prevent the first and second attachment plates from being separated in an axial direction of the pin while the distal end of the key is inserted within the notch of the pin; and moving the supported structure between and into the open position and the closed position to control access to the restricted access area of the aircraft.

In some embodiments of the method, the second attachment plate comprises a bore hole formed within a pivot region of the second attachment plate; the second attachment plate comprises a recess that is connected, via a slot formed in the second attachment plate, with the bore hole of the second attachment plate; and pivotably connecting the first attachment plate and the second attachment plate comprises inserting the pin into the bore hole of the second attachment plate, such that the notch of the pin is coplanar with the slot.

In some embodiments of the method, inserting the key comprises inserting the key within the recess formed in the second attachment plate and sliding the key through the slot such that the distal end of the key is inserted into the bore hole of the second attachment plate and into at least a portion of the notch of the pin.

In some embodiments of the method, the pin is fixedly attached within a bore hole formed in a pivot portion of the first attachment plate, such that the pin cannot be removed from the bore hole of the first attachment plate while the distal end of the key is positioned within the notch of the pin.

In some embodiments, the method comprises disassembling the at least one hinge without any tool, so toollessly.

In some embodiments of the method, the at least one hinge is disassembled by an occupant of the aircraft using only one or both hands of the occupant.

In some embodiments of the method, disassembling the at least one hinge comprises: sliding the key such that the distal end of the key moves within the slot in a direction away from the bore hole of the second attachment plate to disengage the distal end of the key from the notch of the pin; lifting the supported structure relative to the supporting structure in the axial direction of the pin, such that the first attachment plate and the second attachment plate are disconnected from each other; and moving the supported structure into a position other than the closed position so that egress from the restricted access area is not blocked by the supported structure.

In some embodiments of the method, the at least one hinge is a plurality of hinges, the method comprising, for each hinge: sliding the key such that the distal end of the key moves within the slot in a direction away from the bore hole of the second attachment plate to disengage the distal end of the key from the notch of the pin; and lifting the supported structure relative to the supporting structure in the axial direction of the pin, such that the first attachment plate and the second attachment plate are disconnected from each other In some embodiments of the method, the supporting structure is a cabin monument of the aircraft, and the supported structure is a door.

In some embodiments of the method, the notch is formed by a collar of the pin which has a reduced diameter than a diameter of an upper portion and a lower portion of the pin that are attached on respective opposite ends of the collar to form the pin.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically.

DETAILED DESCRIPTION

Hinges that are configured for rapid and toolless disassembly to allow unimpeded egress from an area, such as a fuselage of an aircraft, during an emergency are disclosed herein. It is advantageous for such hinges to be installed on any of a number of barriers that are provided to restrict unauthorized access to a designated area (e.g., an area whose entry is blocked by the barrier when the barrier is in a closed position) to allow for appropriate personnel to respond to the attempted unauthorized access, but are not a so-called "hardened" or fortified barrier that is designed to prevent all access through the barrier for a specified duration of time. An example of a hardened barrier is a door to a cockpit of a commercial aircraft. An example of a secondary barrier would be a door that provides access to the area immediately adjacent to the cockpit door, which is provided primarily to slow, but not necessarily prevent entirely, access of unauthorized persons into the area adjacent to the cockpit door; by slowing access to the area, the flight crew may undertake any suitable actions to prevent unauthorized access to the cockpit, such as by closing and locking the hardened cockpit door before the unauthorized persons are able to breach the secondary barrier and reach the cockpit door itself.

The hinges of such an access control system are advantageously provided on the same side of the barrier as the restricted access area so as to reduce the ability of unauthorized persons on the opposite side of the barrier from being able to readily see/know the locations of the hinges themselves, as well as the component(s) of the hinges that must be moved to allow for disassembly of the latch. It is further advantageous for the barrier to have a stowed position (e.g., against and/or parallel to a cabin monument, so as to not obstruct the movement of passengers along the aisle of the aircraft) in which the barrier, or at least a portion thereof, is positioned over (e.g., directly over) the hinges when the barrier is in the stowed position, so that unauthorized personnel would be unable to determine the position of such hinges during the boarding process of the aircraft. Furthermore, since it is anticipated that such secondary barriers will be provided with time-delay latches that will allow for access by any person, after a prescribed amount of time has elapsed, who releases the latch securing the barrier that prevents access to the restricted access area, it would be more cumbersome and time-consuming for unauthorized persons to find the locations of the hinges and, without being able to visualize the exact locations of the movable components of the hinge, actuate the parts necessary for disassembly of the hinge than it would take for such persons simply to wait until the prescribed amount of time necessary for the time-delay latch to change to an unlatched state elapses. The reason for this is that the prescribed amount of time for the time-delay latch to change to the unlatched state would almost certainly be shorter (e.g., require less time to elapse) than the time it would take for a person to manipulate and disassemble multiple hinges, each of which is in a different position along the height of the barrier. To the contrary, however, flight crew of the aircraft would be trained on the location and use of such hinges and, especially since the movable components of the hinges would be visible to such flight crew seeking egress from the restricted access area, ought to be able to disassemble even multiple hinges in less time than the prescribed amount of time necessary for the time-delay lock to change into the latched state.

In some embodiments, the time-delay latch installed to secure the barrier in the closed position to prevent access to the restricted access area is an electromechanical device, in which electricity is required to allow for operation of the latch. In such instances, a loss of electric power to the latch may render the latch inoperable and, as such prevent passage through the barrier in an emergency situation. By utilizing hinges that are capable of toolless disassembly, such a situation where an inoperable latch can block passage beyond the barrier can be avoided, such that safe passage beyond the barrier can be provided by disassembly of the hinges and physically lifting and/or pushing the barrier out of the passageway blocked by the door in the closed position.

Thus, the use of a hinge that can be readily disassembled in a toolless manner in a secondary barrier of an aircraft would be advantageous in terms of allowing rapid egress of members of the flight crew from the restricted access area, or even to rapidly create a path through the restricted access area when the only viable exit from the aircraft during an emergency situation is through the restricted access area.

Figure 1:
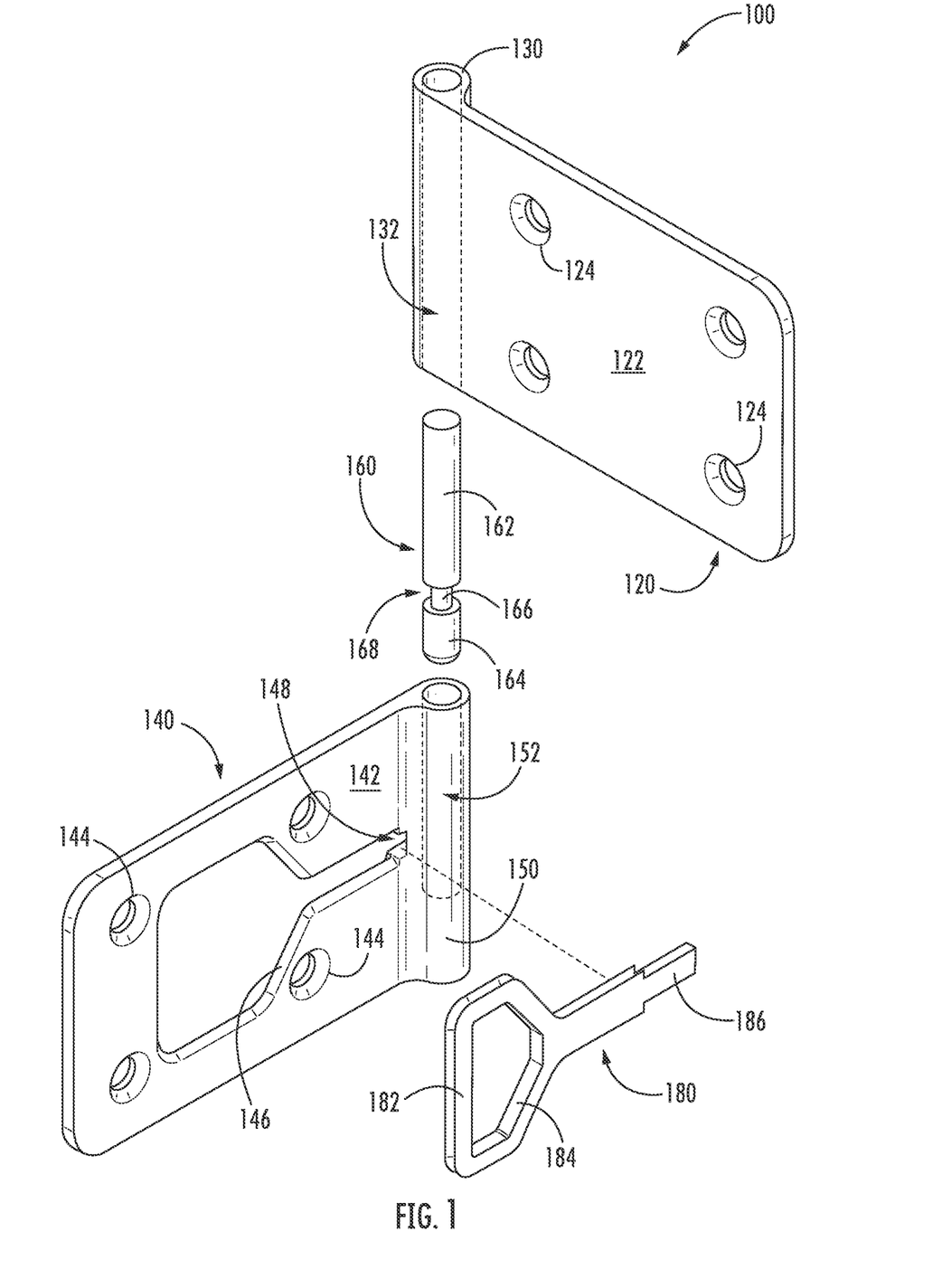
FIG. 1 is an exploded isometric view of an example embodiment of a hinge configured for toolless disassembly.
Figure 2:
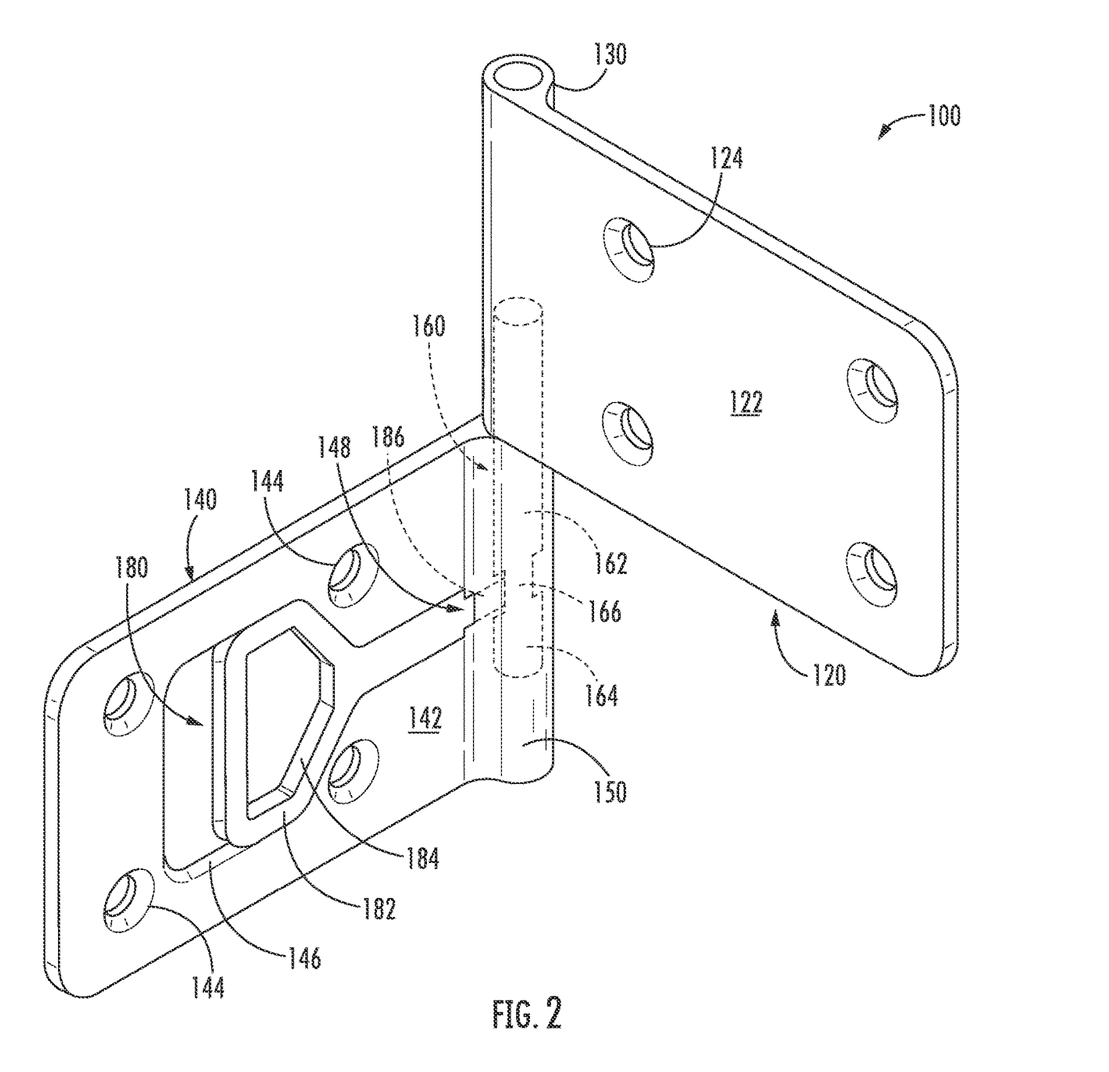
FIG. 2 is an isometric view of the latch of FIG. 1 in an assembled configuration.
Figure 3:
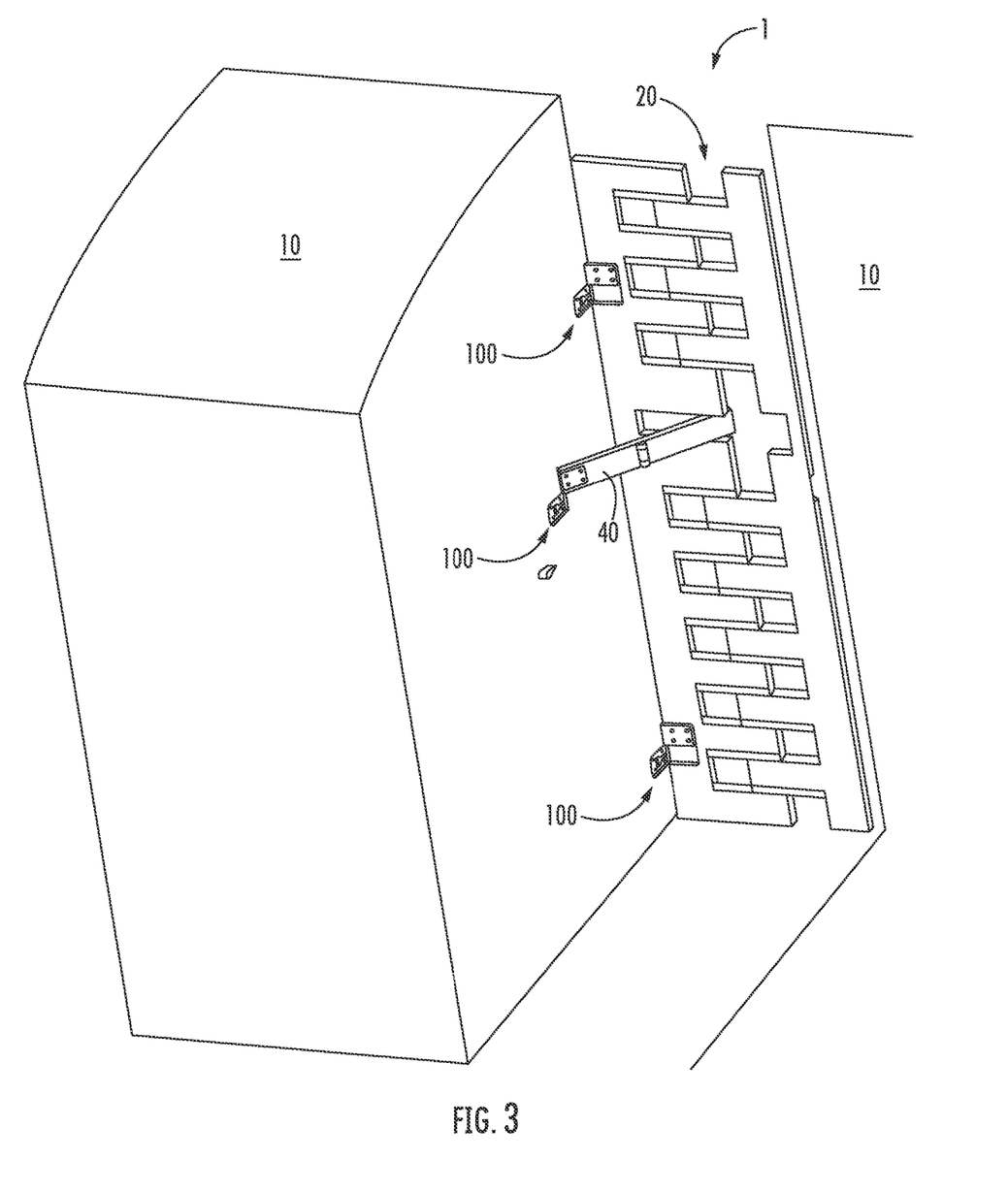
FIG. 3 is an isometric view of a barrier within an aircraft fuselage that is pivotably secured to a cabin monument of the aircraft by a plurality of the latches of FIG. 1.
Figure 4:
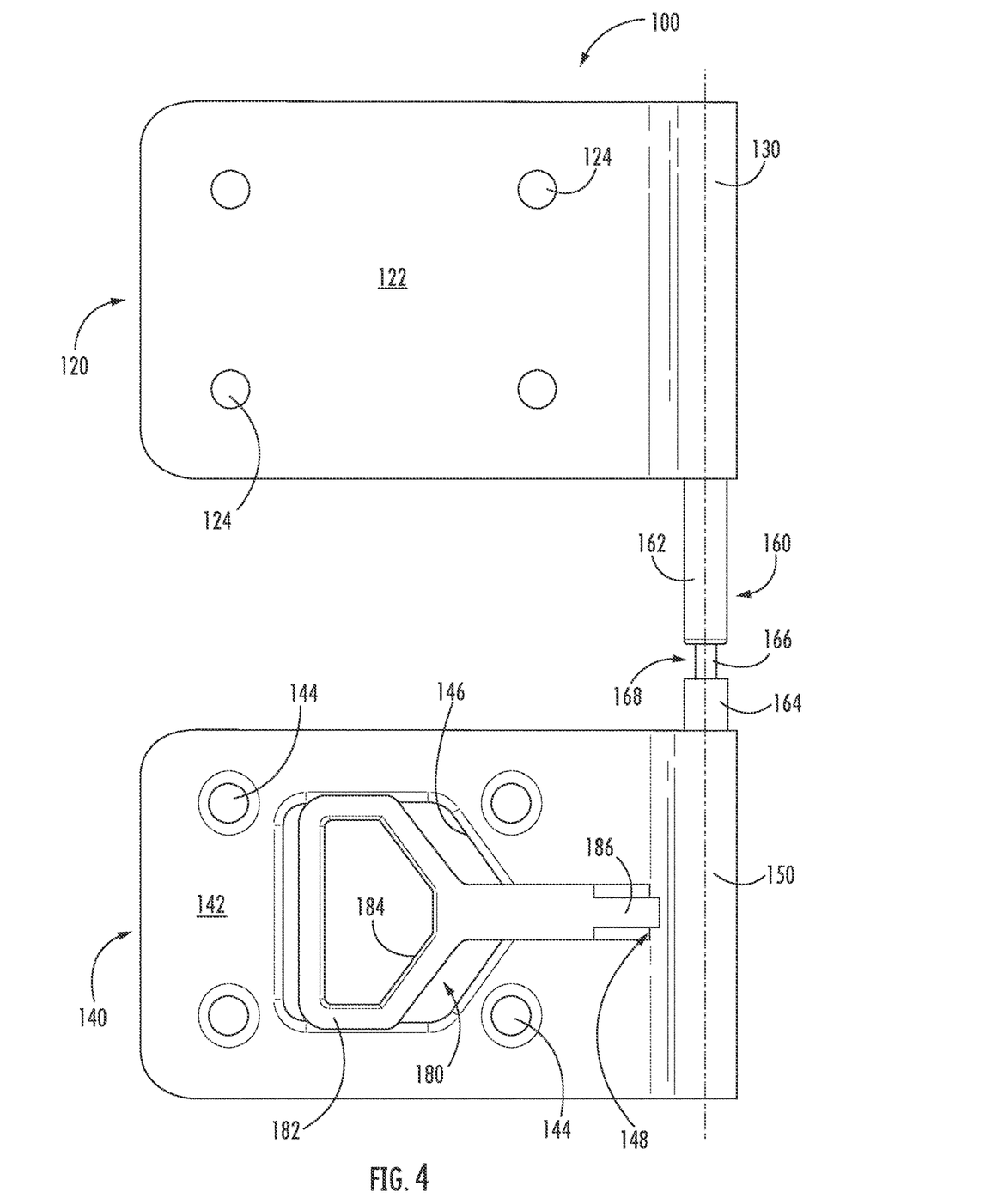
FIG. 4 is a side view of the latch of FIG. 1 in an unlatched state.
Figure 5:
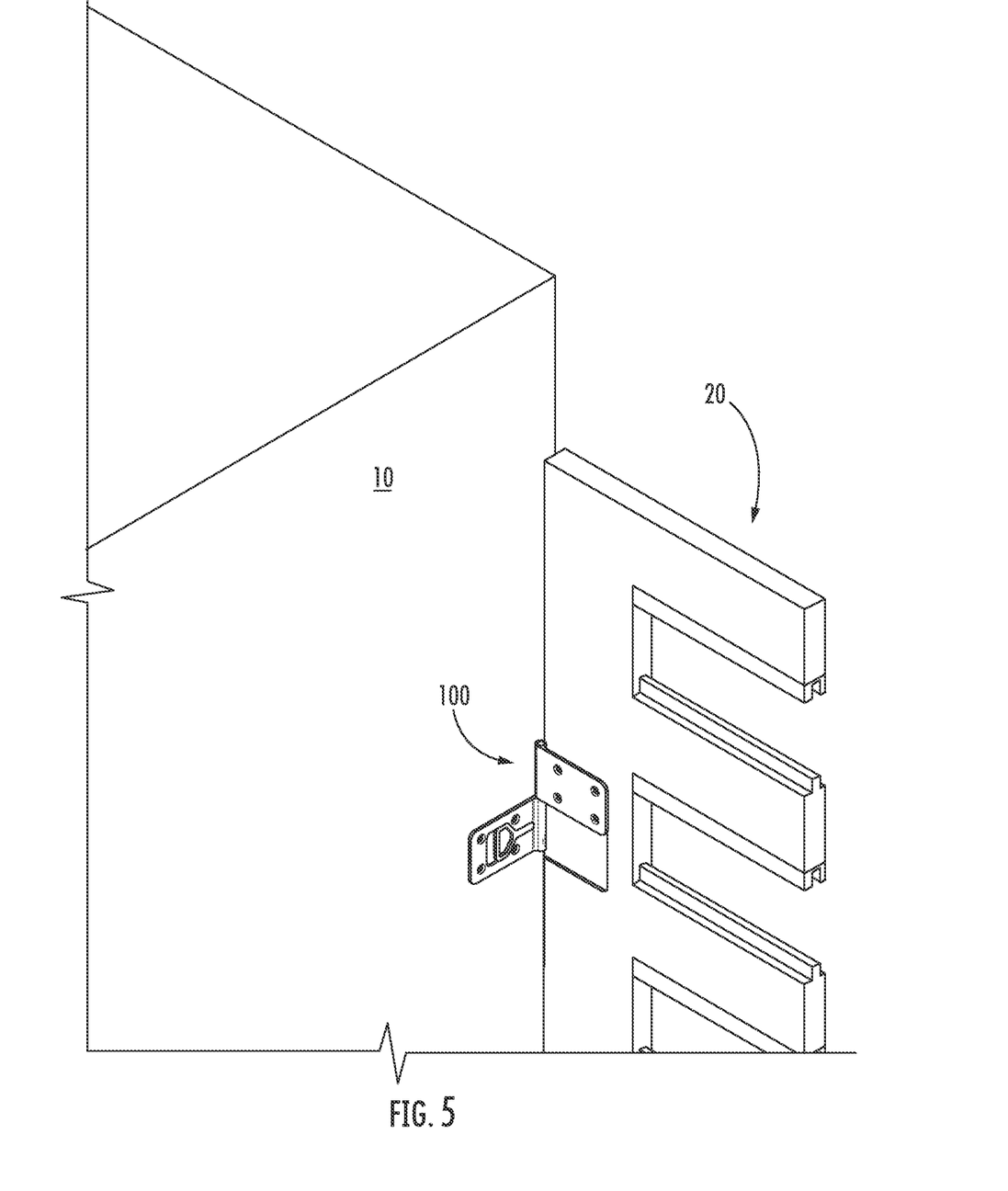
FIG. 5 is an isometric view of a barrier within an aircraft fuselage that is pivotably secured to a cabin monument of the aircraft by a latch of FIG. 1.

An example embodiment of such a hinge is shown in FIGS. 1, 2, and 4, with an example embodiment of an access control system comprising one or more such hinges shown in FIGS. 3 and 5.

In FIGS. 1, 2, and 4, a hinge, generally designated 100, is shown. The hinge comprises a first attachment plate generally designated 120, a second attachment plate generally designated 140, a pin generally designated 160, and a key generally designated 180. The first attachment plate 120 comprises a main body 122, a plurality of fastener holes 124 formed through a thickness (e.g., an entire thickness) of the main body 122, and a pivot portion 130. Any suitable number of fastener holes 124 can be provided in the main body 122. The pivot portion 130 comprises a bore hole, generally designated 132, through all or a portion of the pivot portion 130. The bore hole 132 extends in a substantially axial (e.g., linear) direction, such that the bore hole 132 is parallel to and/or coplanar with the plane defined by the main body 122 shown in the example embodiment of hinge 100.

The main body 122 is not limited to embodiments that are only planar and may have any suitable shape that would conform to (e.g., have the same, or identical, shape as) the shape of the structure to which the first attachment plate 120 is to be attached. Examples of such curved profiles can include, for example, concave and/or convex profiles in any direction. In some embodiments, the thickness of the first attachment plate 120 is variable along the width and/or height thereof. As used herein, "variable" does not mean that the thickness can be changed while in use but is instead used to define the first attachment plate 120 as having a thickness that is different, as measured between the front and rear faces thereof, at different places along the height and/or width of the first attachment plate 120. As used herein, the front face is the surface visible in FIG. 1, and the rear face is the surface that is not shown in FIG. 1 but is an opposite side of the front face. Thus, for example, the first attachment plate 120 may have a different thickness where the main body 122 is attached to (e.g., integrally or in a monolithic, or unitary, manner) the pivot portion 130 than at the opposite (e.g., rightmost edge, as shown in FIG. 1) edge of the main body 122.

In the example embodiment shown in FIGS. 1, 2, and 4, the front surface of the main body 122 is substantially planar (e.g., allowing for planarity tolerances during manufacturing) and the rear surface of the main body 122 is planar over at least a portion (e.g., a majority, including at least 90% or 95%) of the rear surface, the rear surface having a contour where the rear surface meets the pivot portion 130 to have a continuous profile at the intersection of the pivot portion 130 and the main body 122. In some embodiments, the rear surface of the main body 122 is entirely planar and the pivot portion intersects with the rear surface of the main body 122 at an angle that is less than or equal to 90°, including an acute angle. In some embodiments, the rear and front surfaces comprise a contour at the intersection of the pivot portion 130 and the main body 122 that is a continuous profile.

Pin 160 comprises a generally axially-extending structure, which is configured for providing a connection between the first and second attachment plates 120, 140 that allows a relative pivoting movement between the first and second attachment plates 120, 140. Pin 160 has, in the example embodiment disclosed herein, the shape of a cylindrical prism, but any outer profile shape can be used that will allow for the relative pivoting movement between the first and second attachment plates 120, 140. The pin 160 comprises a lower portion 164, a collar 166, and an upper portion 162. The diameter of the collar 166 is smaller than both the upper portion 162 and the lower portion 164, such that a notch, generally designated 168, is formed circumferentially about the collar 166 in the volumetric region defined by the difference between the diameters of the upper and lower portions 162, 164 and the collar 166 and the length of the collar 166 in the axial direction of the pin 160. Thus, the notch 168 defines a volumetric region that is in the shape of a hollow cylinder, formed about the collar 166 of the pin 160.

The key 180 comprises a proximal portion 182 and a distal portion 186. A recess 184 is formed within the proximal portion 182 to allow for the key 180 to be grasped and/or manipulated (e.g., by a human hand) for selective engagement of the distal end 186 within the notch 168 of the pin 160.

The second attachment plate 140 comprises a main body 142, a plurality of fastener holes 144 formed through a thickness (e.g., an entire thickness) of the main body 142, a recess 146 formed through a thickness (e.g., an entire thickness or less than an entire thickness), a slot generally designated 148 that is formed continuous with the recess 146, and a pivot portion 150. Any suitable number of fastener holes 144 can be provided in the main body 142. The pivot portion 150 comprises a bore hole generally designated 152 through a portion (e.g., less than all, only some) of the pivot portion 150. The depth (e.g., in the axial direction of the pin 160) of the bore hole 152 must be selected so that the notch 168 of the pin 160 aligns with the slot 148 that extends into the bore hole 152. The bore hole 152 extends in a substantially axial (e.g., linear) direction, such that the bore hole 152 is parallel to and/or coplanar with the plane defined by the main body 142 shown in the example embodiment of hinge 100.

The recess 146 is formed so as to accommodate the key 180, which is insertable therein in a manner such that the distal end 186 of the key is slidable (e.g., in a plane) through the slot 148 and into the bore hole 152, such that the distal end 186 interfaces with (e.g., is inserted within a portion of, in a sliding manner) the notch 168 of the pin 160. The slot 148 is thus formed to be continuous with the bore hole 152 and the recess 146, to allow for extension of the key from the recess 146, through the slot 148, and into the bore hole 152. When the distal end 186 is inserted within the notch 168 for example in a manner such that the distal end 186 protrudes within the bore hole 152, the distal end 186 prevents in shear the withdrawal of the pin 160 from the bore hole 152. The upper portion 162 has at least a portion thereof inserted within the bore hole 132 of the first attachment plate 120 and another portion thereof inserted within the bore hole of the second attachment plate 140 when the hinge 100 is in an assembled state. In some embodiments, all of the upper portion 162 can be positioned within bore hole 132 of the first attachment plate 120, such that no portion of the upper portion 162 is positioned within the bore hole 152 of the second attachment plate 140 when the hinge is in the assembled state.

In some embodiments, the pin 160 can have a cap formed at an opposite end of the upper portion 162 from where the upper portion 162 is attached to the collar 164 and the pin 160 can extend through an entirety of the bore hole 132 of the first attachment plate 130, such that the first attachment plate 120 and the second attachment plate 140 are secured together when the distal end 186 of the key 180 is inserted within and/or positioned within the notch 168. In some embodiments, the pin 160 can be rigidly attached (e.g., by brazing, welding, adhesive, etc.) within the bore hole 132 of the first attachment plate 120, such that the pin 160 cannot be removed from the bore hole 132 of the first attachment plate 120 while the distal end 186 of the key 180 is positioned within the notch 168 of the pin 160. The hinge 100 is advantageously constructed such that the pin 160 cannot be removed from the bore hole 132 of the first attachment plate 120, at least not while the distal end 186 of the key 180 is positioned within the notch 168 of the pin 160.

It is advantageous for removal of the pin 160 from the bore hole 132 of the first attachment plate 120 to be prevented while the distal end 186 of the key 180 is positioned within the notch 168 of the pin 160, since that would allow for the first attachment plate 120 to be lifted off of the pin 160 even while the distal end 186 of the key 180 remains engaged within the notch 168 of the pin 160. In the example embodiment shown, the pin 160 is rigidly affixed to the first attachment plate 120, such that rotation of the pin 160 relative to the first attachment plate 120 is prevented. Thus, the pin 160 is advantageously rotatably locked to the first attachment plate 120, such as via a welding, solder, brazing, adhesive, or any other suitably rigid type of attachment, such that a permanent joint is formed between the pin 160 and the first attachment plate 120. Therefore, in the example embodiment shown, the sliding movement of the key 180 through the slot 148, such that the distal end 186 of the key 180 is entirely disengaged from the notch 168 of the pin 160, the first attachment plate 120, as well as the pin 160 rigidly attached thereto and also any supported structure (e.g., a door) to which the first attachment plate 120 is attached, is then movable (e.g., in a unitary, or monolithic, manner) away (e.g., vertically upwards in the view of FIGS. 1, 2, and 4, in the direction of the longitudinal axis of the pin 160) from the second attachment plate 140. Thus, since the pin 160 is rigidly affixed to the first attachment plate 120, when the hinge 100 is in an assembled state, the key 180 is engaged within the notch 168 of the pin 160 and the entirety of the hinge 100 is locked together, such that the first and second attachment plates 120, 140 are only able to move freely relative to each other in rotation about the longitudinal axis of the pin 160.

The main body 142 is not limited to embodiments that are only planar and may have any suitable shape that would conform to (e.g., have the same, or identical, shape as) the shape of the structure to which the second attachment plate 140 is to be attached. Examples of such curved profiles can include, for example, concave and/or convex profiles in any direction. In some embodiments the thickness of the second attachment plate 140 is variable along the width and/or height thereof. As used herein, "variable" does not mean that the thickness can be changed while in use, but is instead used to define the second attachment plate 140 as having a thickness that is different, as measured between the front and rear faces thereof, at different places along the height and/or width of the second attachment plate 140. As used herein, the front face is the surface visible in FIG. 1 and the rear face is the surface that is not shown in FIG. 1 but is an opposite side of the front face. Thus, for example, the second attachment plate 140 may have a different thickness where the main body 142 is attached to (e.g., integrally or in a monolithic, or unitary, manner) the pivot portion 150 than at the opposite (e.g., rightmost edge, as shown in FIG. 1) edge of the main body 142.

In the example embodiment shown in FIGS. 1, 2, and 4, the front surface of the main body 142 is substantially planar (e.g., allowing for planarity tolerances during manufacturing) and the rear surface of the main body 142 is planar over at least a portion (e.g., a majority, including at least 90% or 95%) of the rear surface, the rear surface having a contour where the rear surface meets the pivot portion 150 to have a continuous profile at the intersection of the pivot portion 150 and the main body 142. In some embodiments, the rear surface of the main body 142 is entirely planar and the pivot portion intersects with the rear surface of the main body 142 at an angle that is less than or equal to 90°, including an acute angle. In some embodiments, the rear and front surfaces comprise a contour at the intersection of the pivot portion 150 and the main body 142 that is a continuous profile.

FIG. 2 shows the distal end 186 inserted through the slot 148 and into the notch 168 of the pin 160 to lockingly secure the pin 160 to the second attachment plate 140 unless and/or until the key 180 is moved within the recess 146 of the second attachment plate 140 such that the distal end 186 of the key 180 is entirely disengaged from the notch 168 of the pin 160. FIG. 4 shows the key 180 in such a disengaged position, such that the pin 160 can be removed from the bore hole 152 of the second attachment plate 140. In some embodiments, the second attachment plate 140 comprises a deformable structure within the recess 146 that prevents the key 180 from being removed from the recess 146 without moving the deformable structure, which allows for the key 180 to be moved further (e.g., in the direction to the left, as shown in FIG. 4) within the recess 146 and then removed from the recess 146. In some embodiments, the recess 146 may have one or more retention features, such as, for example, detents or bumps, that engage with corresponding features formed on the key 180, so as to resist (e.g., require a force greater than would be required due only to the frictional force generated between the walls of the recess 146 and the key 180 due to sliding the key 180 within the recess 146 without the presence of such retention features) the distal end 186 of the key being slid within the slot 148 in the direction that would disengage the distal end 186 from a position in which the distal end 186 is positioned within the notch 168 of the pin 160.

FIGS. 3 and 5 show an example embodiment of an access control system, generally designated 1, which includes a supporting structure 10 (e.g., a cabin monument, or wall, of an aircraft cabin) and a supported structure 20 (e.g., a door, such as a laterally-expandable secondary barrier) that are attached together by a plurality of hinges 100, which are able to be disassembled in a toolless manner. The supported structure 20 is reinforced by a brace arm 40, which is also shown optionally being connected to the supported structure 10 using another of the hinges 100. As such, the hinges 100 connecting the supported structure 20 and the brace arm 40 to the supporting structure 10 are able to be disassembled in a toolless manner (e.g., using only a human hand, without the use of any tools), such that the supported structure 20 and/or the brace arm 40, can be lifted vertically, after the distal end 186 of the key 180 has been removed from the notch 168 of the pin 160, to remove the pin 160 from the bore hole 152 of the second attachment plate 140 and/or from the bore hole 132 of the first attachment plate 120, such that the supported structure 20 is no longer physically attached to the supporting structure 10 and the supported structure 20 can be moved independently of the supporting structure 10.

Thus, an example embodiment of a method of use for such a hinge 100, or of a system comprising a plurality of such hinges 100, is disclosed herein as well. Specifically, the method comprises the steps of providing at least one hinge 100, attaching the first attachment plate 120 to the supported structure 20, attaching the second attachment plate 120 to the supporting structure, inserting the pin within the pivot portions 130, 150 of the first and second attachment plates 120, 140, positioning the key 180 within the recess of the second attachment plate 140, and sliding the key 180 within the recess 146 such that the distal end 186 of the key 180 slides through the slot 148 of the second attachment plate 140 and into engagement within the notch 168 defined by the collar 166 of the pin 160 to secure the first and second attachment plates 120, 140 together in a pivotable manner, and pivoting the supported structure 20 relative to the supporting structure 10 into and between a closed position, in which access to a restricted access area (e.g., of an aircraft, such as outside a cockpit door) is prevented, and an open position, in which access to the restricted access area is not prevented.

The method further comprises the step of, for example, during an emergency when rapid egress is necessary from within the restricted access area through the area blocked by the supported structure 20 when in the closed position, disassembling the hinge 100. The step of disassembling the hinge 100 comprises, for example, sliding the key 180 within the recess 146, such that the distal end 186 of the key 180 moves within the slot 148 in the direction away from the pivot portion 150 of the second attachment plate 140 and is removed from and/or disengaged from the notch 168 of the pin 160 formed by the collar 166; vertically lifting (e.g., in the axial direction of the pin 160) the supported structure 20 relative to the supporting structure 10, such that the first attachment plate 120 and the supported structure 20 attached thereto are physically decoupled (e.g, not in direct contact with) from the second attachment plate 140 and the supporting structure 10 attached thereto; repeating these steps for each hinge 100 by which the supported structure 20 is attached to the supporting structure 10; and moving the supported structure 20 into a position other than the closed position so that egress from the restricted access area is not blocked by the supported structure 20. The brace arm 40 is considered as being a part of the supported structure 20 at least for purposes of the description of the example embodiment of the method herein.

In some embodiments of a system comprising a plurality of hinges 100, it is envisioned that at least one of the hinges 100 may be configured in a manner opposite from that shown in FIGS. 1, 2, and 4, such that, upon removal of the distal end 186 from the notch 168, the pin 160 can, with the assistance of gravity, fall out of the bore hole 152 of the second attachment plate 140.

It is understood that the example embodiments disclosed herein are not limiting and do not restrict the object disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A hinge configured for toolless assembly and disassembly, the hinge comprising:
   a first attachment plate for attachment to a supported structure;
   a second attachment plate for attachment to a supporting structure;
   a pin comprising a notch in an outer surface of the pin and configured for insertion into the first and second attachment plates for pivotably connecting the first and second attachment plates together, wherein the pin is fixedly attached within a bore hole in a pivot portion of the first attachment plate such that rotation of the pin relative to the first attachment plate is prevented, wherein the pin is inserted so that the notch is positioned within the second attachment structure when the hinge is in an assembled state; and
   a key that comprises a main body and a distal end extending from the main body, which is configured for insertion within the notch of the pin;
   wherein the key is movable such that the distal end of the key can be inserted into engagement with the notch of the pin to allow relative rotation of the first attachment plate and the second attachment plate but prevent the first and second attachment plates from being separated in an axial direction of the pin; and
   wherein the key is movable such that the distal end of the key can be removed from engagement with the notch of the pin to allow the first and second attachment plates to be separated in the axial direction of the pin.

2. The hinge of claim 1, wherein:
   the second attachment plate comprises a bore hole within a pivot region of the second attachment plate;
   the second attachment plate comprises a recess that is connected, via a slot in the second attachment plate, with the bore hole of the second attachment plate;
   the pin, when the hinge is in an assembled state, is positioned within the bore hole of the second attachment plate, such that the notch of the pin is coplanar with the slot; and
   the recess is configured such that, during assembly of the hinge, the key is insertable within the recess and configured to slide through the slot, such that the distal end of the key is inserted into the bore hole of the second attachment plate and into at least a portion of the notch of the pin.

3. The hinge of claim 1, wherein the notch is formed by a collar of the pin which has a reduced diameter than a diameter of an upper portion and a lower portion of the pin that are attached on respective opposite ends of the collar to form the pin.

4. A system for controlling access to a restricted access area, the system comprising:
   a supporting structure defining at least a portion of the restricted access area;
   a supported structure; and
   a plurality of hinges each configured for toolless assembly and disassembly and each comprising:
      a first attachment plate attached to the supported structure;
      a second attachment plate attached to the supporting structure;
      a pin comprising a notch in an outer surface of the pin and configured for insertion into the first and second attachment plates for pivotably connecting the first and second attachment plates together, wherein the pin is inserted so that the notch is positioned within the second attachment structure when the hinge is in the assembled state; and
      a key that comprises a main body and a distal end extending from the main body, which is configured for insertion within the notch of the pin to prevent the first and second attachment plates from being separated in an axial direction of the pin while the distal end of the key is inserted within the notch of the pin;
   wherein each of the plurality of hinges is configured such that the supported structure is movable, relative to the supporting structure, between a closed position, in which access to the restricted access area is blocked by the supported structure, and an open position, in which access to the restricted access area is not blocked by the supported structure; and
   wherein the key of each of the plurality of hinges is movable, when the supported structure is in the closed position, such that the distal end of the key can be removed from engagement with the notch of the pin to allow the first and second attachment plates to be separated in the axial direction of the pin.

5. The system of claim 4, wherein:
   the second attachment plate comprises a bore hole within a pivot region of the second attachment plate;
   the second attachment plate comprises a recess that is connected, via a slot in the second attachment plate, with the bore hole of the second attachment plate;
   the pin, when the hinge is in an assembled state, is positioned within the bore hole of the second attachment plate, such that the notch of the pin is coplanar with the slot; and
   the recess is configured such that, during assembly of the hinge, the key is insertable within the recess and configured to slide through the slot, such that the distal end of the key is inserted into the bore hole of the second attachment plate and into at least a portion of the notch of the pin.

6. The system of claim 5, wherein:
each of the plurality of hinges is configured such that, during disassembly, the key is configured to slide within the recess, such that the distal end of the key moves within the slot in a direction away from the bore hole of the second attachment plate to disengage the distal end of the key from the notch of the pin, such that the hinge is in a disassembled state; and
when each of the hinges is in the disassembled state:
the supported structure is configured to be lifted, relative to the supporting structure, in the axial direction of the pin, such that the first attachment plate and the second attachment plate are disconnected from each other; and
the supported structure is movable into a position other than the closed position so that egress from the restricted access area is not blocked by the supported structure.

7. The system of claim 4, wherein each of the plurality of hinges is configured for disassembly by an occupant within the restricted access area using only one or both hands of the occupant.

8. An aircraft comprising the system of claim 4, wherein a restricted access area of the aircraft is a region in which only a flight crew member of the aircraft is authorized entry.

9. The aircraft of claim 8, wherein the supporting structure is a cabin monument of the aircraft, the supported structure is a door, and a cockpit door is accessible directly from within the restricted access area.

10. A method of controlling access to a restricted access area of an aircraft, the method comprising:
providing at least one hinge, each hinge comprising:
a first attachment plate;
a second attachment plate;
a pin comprising a notch in an outer surface of the pin; and
a key;
attaching the second attachment plate to a supporting structure;
attaching the first attachment plate to a supported structure that is movable between a closed position, in which access to the restricted access area of the aircraft is blocked by the supported structure, and an open position, in which access to the restricted access area of the aircraft is not blocked by the supported structure;
pivotably connecting, using the pin, the first attachment plate and the second attachment plate;
inserting the key such that a distal end of the key is inserted within the notch of the pin to prevent the first and second attachment plates from being separated in an axial direction of the pin while the distal end of the key is inserted within the notch of the pin;
moving the supported structure between and into the open position and the closed position to control access to the restricted access area of the aircraft; and
selectively disassembling the at least one hinge toollessly by:
moving the key of each of the plurality of hinges, when the supported structure is in the closed position, such that the distal end of the key is removed from engagement with the notch of the pin; and
separating the first and second attachment plates in the axial direction of the pin.

11. The method of claim 10, wherein:
the second attachment plate comprises a bore hole within a pivot region of the second attachment plate;
the second attachment plate comprises a recess that is connected, via a slot in the second attachment plate, with the bore hole of the second attachment plate; and
pivotably connecting the first attachment plate and the second attachment plate comprises inserting the pin into the bore hole of the second attachment plate, such that the notch of the pin is coplanar with the slot.

12. The method of claim 11, wherein inserting the key comprises inserting the key within the recess in the second attachment plate and sliding the key through the slot such that the distal end of the key is inserted into the bore hole of the second attachment plate and into at least a portion of the notch of the pin.

13. The method of claim 11, wherein the pin is fixedly attached within a bore hole in a pivot portion of the first attachment plate, such that the pin cannot be removed from the bore hole of the first attachment plate while the distal end of the key is positioned within the notch of the pin.

14. The method of claim 10, wherein the at least one hinge is disassembled by using only one hand or both hands of a user.

15. The method of claim 10, wherein disassembling the at least one hinge comprises:
sliding the key such that the distal end of the key moves within the slot in a direction away from the bore hole of the second attachment plate to disengage the distal end of the key from the notch of the pin;
lifting the supported structure relative to the supporting structure in the axial direction of the pin, such that the first attachment plate and the second attachment plate are disconnected from each other; and
moving the supported structure into a position other than the closed position so that egress from the restricted access area is not blocked by the supported structure.

16. The method of claim 15, wherein the at least one hinge is a plurality of hinges, the method comprising, for each hinge:
sliding the key such that the distal end of the key moves within the slot in a direction away from the bore hole of the second attachment plate to disengage the distal end of the key from the notch of the pin; and
lifting the supported structure relative to the supporting structure in the axial direction of the pin, such that the first attachment plate and the second attachment plate are disconnected from each other.

17. The method of claim 10, wherein the supporting structure is a cabin monument of the aircraft, and the supported structure is a door.

18. The method of claim 10, wherein the notch is formed by a collar of the pin which has a reduced diameter than a diameter of an upper portion and a lower portion of the pin that are attached on respective opposite ends of the collar to form the pin.

* * * * *